Nov. 21, 1950 R. L. RUMPF, JR 2,530,995

OSCILLATOR TANK CIRCUIT CONFIGURATION

Filed Oct. 7, 1946

WITNESSES:
Edward Michaels
Wm. C. Groome

INVENTOR
Rupert L. Rumpf, Jr.
BY
F. W. Lyle
ATTORNEY

Patented Nov. 21, 1950

2,530,995

UNITED STATES PATENT OFFICE 2,530,995

OSCILLATOR TANK CIRCUIT CONFIGURATION

Rupert L. Rumpf, Jr., Catonsville, Md., assignor to Westinghouse Electric Corporation, East Pittsburgh, Pa., a corporation of Pennsylvania Application October 7, 1946, Serial No. 701,843

1 Claim. (Cl. 250—36)

My invention relates to electrical discharge tube circuits and, in particular, relates to a novel structure for a tank circuit and the channel connecting it with other portions of a high-frequency circuit, such as an oscillation generator.

In the prior art, it has frequently been desirable to insulate certain portions of high-frequency alternating-current circuits from other portions; for example, to insulate the tank circuit of an oscillation generator from conductive connection with the direct-current circuit supplying power to its anode. The interposition of so-called blocking capacitors has been common for this purpose; but where high power outputs are to be employed as, for example, in high-frequency electric heating generators, the size of the blocking condenser becomes so great that it constitutes a major item of expense when conventional capacitors of the prior art are employed for this purpose.

One object of my invention is, accordingly, to provide a novel form of blocking capacitor for insulating one portion of a high-frequency alternating current from other portions in respect to flow of direct current.

Another object of my invention is to provide a novel form of blocking capacitor suitable for connection between the anode circuit of an oscillation generator and the tank circuit thereof.

Still another object of my invention is to provide an improved form of tank circuit and connecting channels therefor suitable for high-frequency oscillation generators.

Still another object of my invention is to provide a suitable form of tuned circuit for high-frequency use in which the stray and undesired radiation of energy to surrounding objects shall be minimized.

Other objects of my invention will become apparent upon reading the following description, taken in connection with the drawing, in which.

Figure 1:
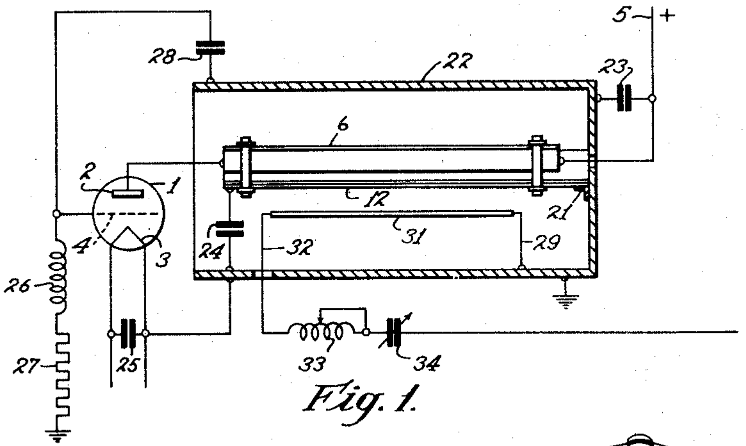
Figure 1 is a schematic view, partly in section, showing an oscillation generator provided with a tank circuit embodying the principles of my invention.

Referring in detail to Figure 1, an electrical dischareg tube 1 of conventional type, embodying an anode 2, a cathode 3 and a control electrode 4, is supplied with direct current from the positive terminal 5 of a source having its negative terminal grounded. The connection from the anode 2 to the positive terminal 5 embodies a conductor 6, which is shown in more detail in Fig. 2. The conductor 6 comprises a plate 7 having projecting ribs 8, 9, 11 which may be described as forming multiple channels or troughs. The channel-member 6 cooperates with a member 12 of substantially similar form comprising a plate 13 having projecting ribs 14, 15, 16. The members 6 and 12 are held slightly spaced apart by frames each consisting of two cross members 17, 18 held in parallel relationship by suitable insulators 19. It will be readily seen that the two-channel-members 6 and 12, when thus held spaced apart, constitute, in effect, an air-condenser or capacitor having an air dielectric.

The channel-member 12 is supported, for example by a bracket 21, in the interior of an enclosing shield or chamber 22 having conducting walls which are connected to ground, preferably at a point near the end of said chamber remote from the tube 1. The conductor connecting the channel-member 6 to the positive terminal 5 passes through a suitable hole in the end wall of the chamber 22, said hole being of proper size for electrical clearance for the potential on said conductor, or having a suitable insulating bushing. The lead wire from the terminal 5 is connected to said end wall through a suitable bypass capacitor 23. The end of the channel-member 12 adjacent the discharge tube 1 is connected to the interior wall of the chamber 22 through a capacitor 24. The cathode 3 of the tube 1 is connected to the adjacent wall of the chamber 22 and, where it is of the directly heated type, is bridged by a capacitor 25. The control electrode 4 of the tube 1 is connected to ground through an inductance 26 and a resistor 27 and is likewise connected to the adjacent end of the chamber 22 through a capacitor 28. Capacitance 24 may be omitted in which case the capacitance of channel 12 to chamber 22 performs the same function as the additional capacitance 24.

A moment's consideration will show that the capacitor 24 and the channel-member 12, together with the adjacent walls of the enclosing chamber 22, constitute a tank circuit capable of oscillating at a characteristic frequency, the channel-member 12 constituting, in effect, the principal inductance of this oscillating circuit. The energy for said oscillating circuit is fed capacitatively through the channel-members 6, 12 from the anode 2 of the tube 1, said members 6 and 12 thus, in effect, constituting the plates of a blocking condenser between said tank circuit and said anode.

Energy for any desired load circuit may be abstracted from this tank circuit through a pick-up loop comprising conductors 29, 31 and 32, the latter of which passes through a suitable opening in the wall of chamber 22. Connection to the load may be conveniently made through the variable inductance 33 and variable capacitor 34. Energy may also be abstracted from the tank circuit by a conductor connected directly to channel 12 at a suitable point and passing through a suitable hole in chamber 22. The point of connection then determines the impedance match between the tank circuit and load.

The capacitance between the members 6 and 12 may, of course, be varied by varying the length of the insulators 19, but for most purposes the length of the latter should be made as small as is consistent with insulation of the member 6 from the member 12 at the high-frequency voltage being generated in the tank circuit. Variation of the amount of energy abstracted from the interior of the tank circuit may be made by suitably varying the area within the latter enclosed between the members 29, 31, 32.

It may be desired for some purposes to extend the walls of the chamber 22 sufficiently to enclose the generator tube 1 within them. The location of the principal high-frequency circuits of the apparatus within the chamber 22 prevents undesired radiation to external objects and shields the tube-leads and connected circuits from undesired capacitative coupling therewith.

Figure 2:
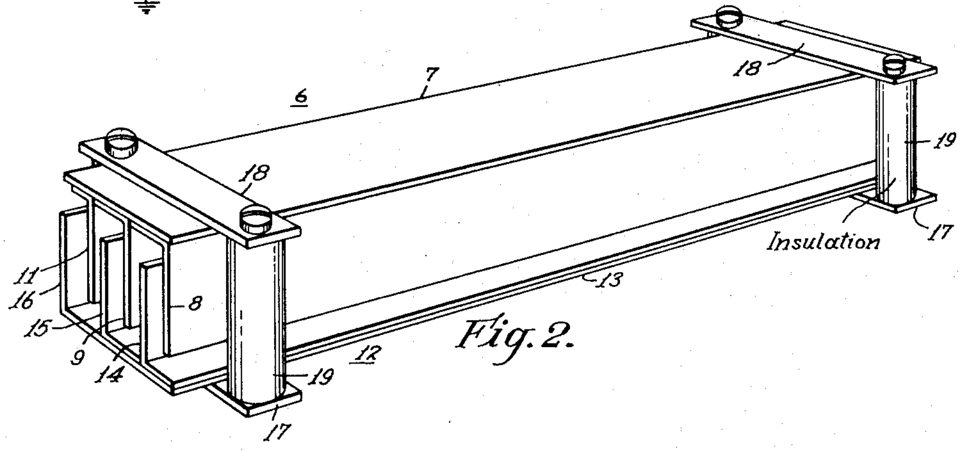
Fig. 2 is a perspective view of a blocking capacitor embodying certain principles of my invention.
Figure 3:
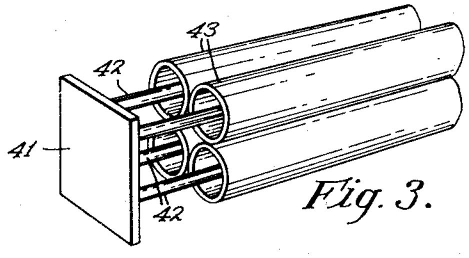
Fig. 3 is a perspective view of an alternative form of blocking capacitor in accordance with my invention.

Fig. 3 illustrates an alternative form which may be given to the capacitance constituted in Figs. 1 and 2 by the members 6 and 12. In Fig. 3, the equivalent of the channel-member 6 consists of a pair of end plates, such as 41, interconnected with each other by a suitable number of parallel rod-like conductors 42. Surrounding each of the conductors 42 is a conducting cylinder or pipe 43 which may be held in spaced relation by suitable insulators bearing on the rods 42. The tubes 43 are preferably connected together, for example, by making them of such size that they touch each other. The tubular members 43 constitute the equivalent in Fig. 3 of the channel-member 12 in Figs. 1 and 2.

Figure 4:
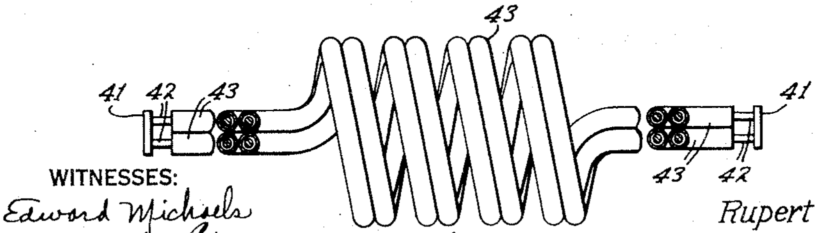
Fig. 4 is a still different form of blocking capacitor embodying the principles of my invention.

The anode of the oscillation generator may be connected to one end plate 41 in Fig. 3, and the positive terminal of the direct-current source be connected to the other end plate 41 (not shown).

Where the frequency of the oscillation generator is to be so low that the necessary tuning of the tank circuit cannot be effected without making the channel-member 12 unduly long, the arrangement of Fig. 3 may be altered to one in which the tubes 43, instead of being rectilinear, are coiled up into a helix, spiral or other suitable form to reduce the overall dimensions of the device. This will obviously greatly increase the self-inductance inherent in the elements 43 constituting the inductance of the tank circuit and cooperating with the capacitor 24 to determine the tuned frequency of the latter. The arrangements of Fig. 3 and Fig. 4 may, of course, be enclosed within a shielding chamber 22 in the same manner as the capacitance 6, 12 in Fig. 1.

I claim as my invention:

An oscillation generator comprising an anode, a cathode and a control electrode, a first channel-member having one end connected to said anode and having the positive terminal of a direct current source connected to its other end, a second channel-member spaced away from said first channel-member to constitute a capacitance therewith, a conducting chamber surrounding said channel-members, means for conductively connecting the end of said second channel-member which is nearest to the end of said first channel-member which is connected to said direct current source with one point on the walls of said chamber, a connection from the negative terminal of said direct current source to a second point near said first point on the walls of said chamber, a biasing means connecting said control electrode to said second point, a substantially impedance-free connection between said cathode, and a third point on the walls of said chamber, a capacitor interconnecting said third point with the end of said second channel-member which is nearer the end of said first channel-member to which said anode is connected, a capacitor interconnecting said control electrode with a fourth point on the walls of said chamber, and means for coupling a load circuit with the space inside said chamber.

RUPERT L. RUMPF, Jr.

REFERENCES CITED

The following references are of record in the file of this patent:

UNITED STATES PATENTS

| Number | Name | Date |
|---|---|---|
| 464,667 | Tesla | Dec. 8, 1891 |
| 793,647 | Fessenden | July 4, 1905 |
| 1,422,312 | Smith | July 11, 1922 |
| 1,702,413 | Pfiffner | Feb. 19, 1929 |
| 1,943,714 | Bailey | Jan. 16, 1934 |
| 2,120,518 | Dreyer | June 14, 1938 |
| 2,272,211 | Kohler | Feb. 10, 1942 |
| 2,398,502 | Morrison | Apr. 16, 1946 |